United States Patent [19]
Goldston et al.

[11] Patent Number: 6,033,487
[45] Date of Patent: Mar. 7, 2000

[54] CLEANING DEVICE AND PROCESS FOR MECHANICAL MEAT AND FRUIT SEPARATOR CHAMBERS OR SCREENS

[75] Inventors: Thomas C. Goldston; Dean E. Baughman, both of Lehi, Utah

[73] Assignee: Beehive, Inc., Sandy, Utah

[21] Appl. No.: 08/761,635

[22] Filed: Dec. 6, 1996

Related U.S. Application Data

[60] Provisional application No. 60/010,445, Jan. 23, 1996.

[51] Int. Cl.[7] ................................. B08B 3/00; B08B 5/04
[52] U.S. Cl. ........................... 134/21; 134/11; 134/22.1; 134/25.3; 134/30; 134/102.1; 134/105; 134/169 C
[58] Field of Search ................................. 139/21, 11, 22.1, 139/25.3, 30, 37, 169 C, 102.1, 105, 200

[56] References Cited

U.S. PATENT DOCUMENTS

| | | | |
|---|---|---|---|
| 543,477 | 7/1895 | Frye | 134/169 C |
| 3,873,363 | 3/1975 | Bakka et al. | 134/22.1 |
| 3,900,339 | 8/1975 | Filipn et al. | 134/22.1 |
| 5,137,581 | 8/1992 | Takahashi | 134/30 |
| 5,401,321 | 3/1995 | Hugo et al. | 134/21 |

Primary Examiner—Randy Gulakowski
Assistant Examiner—Saeed Chaudhry
Attorney, Agent, or Firm—Andrus, Sceales, Starke & Sawall

[57] ABSTRACT

A process and device for disloding hard food particles from perforations of a food separation chamber utilizes a closed pressure vessel in which the separation chamber is mounted, the particles lodged in the perforations being subjected while the separation chamber is in the vessel to a predetermined pressure and temperature until the particles are gelatinized. The vessel is then rapidly depressurized for suctioning out the gelatinized material from the perforations and for cleaning and sterilizing the separation chamber.

19 Claims, 2 Drawing Sheets

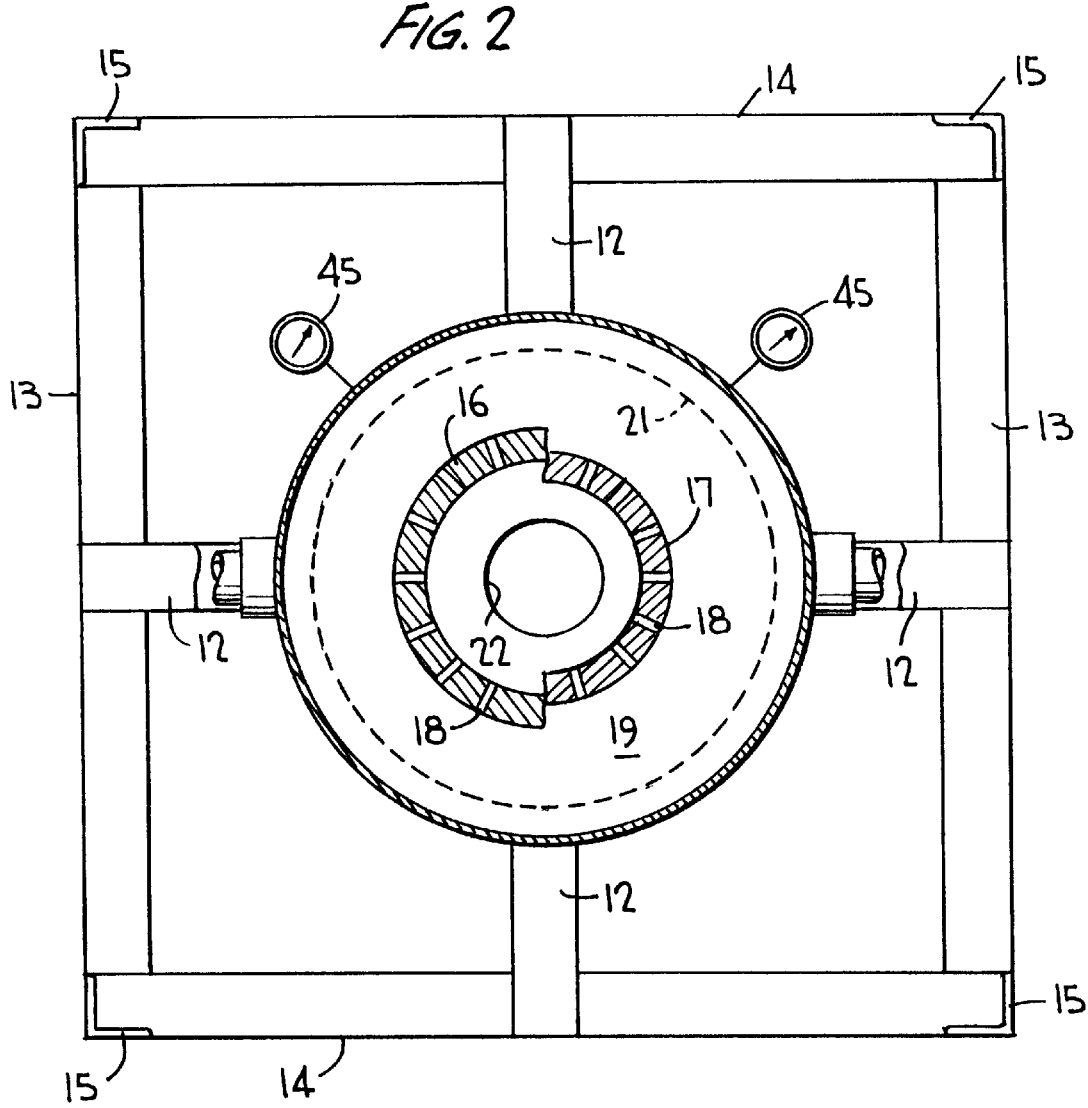

CLEANING DEVICE AND PROCESS FOR MECHANICAL MEAT AND FRUIT SEPARATOR CHAMBERS OR SCREENS

This Application claims the benefit of U.S. provisional application Ser. No. 60/010,445, Jan. 23, 1996.

BACKGROUND OF THE INVENTION

This invention relates generally to a cleaning device and process for dislodging trapped bone and fruit seed particles from the perforations of a separation chamber used in deboning machines and in seeded fruit separators. More particularly, removal of the lodged particles is effected by gelatinizing the particles using super-hot steam introduced into a pressure vessel, whereafter the pressure vessel is rapidly decompressed.

Deboning machines for mechanically recovering meat from bone, sinew and cartilage, are known as utilizing a perforated separation chamber or conduit in the meat separating operation. A compression type, conveyor screw, or auger operates in the perforated chamber and, by controlling the pressure within the chamber, the meat is separated from the bone, cartilage and sinew as it passes through the perforations.

A deboning machine of the foregoing type is disclosed in U.S. Pat. No. 4,189,104, commonly owned herewith. That separation chamber is commonly known as having perforations in the form of round holes. An improved slotted separation chamber for a deboning machine is disclosed in U.S. provisional application Ser. No. 60/010,444, filed Jan. 23, 1996, entitled Deboning Machine With Slotted Separation Chamber, naming Thomas C. Goldston as inventor, and commonly owned herewith.

These and other type separation chambers are likewise used in fruit processing machines for separating seeds from the fruit pulp.

And, other types of deboning machines utilizing a ram in combination with a perforated separation chamber for meat recovery, are known.

The perforations of the separation chamber of whatever type become clogged with bone, sinew and cartilage at some stage during the meat processing operation, and during fruit processing the perforations are found to become clogged with seeds. The food processing operations are thus hampered reducing their efficiency unless the separation chambers are cleaned.

The separation chambers are typically of polished steel of a sufficient gauge and hardness to withstand the pressures generated during the separation process. A known cleaning method for dislodging hard food particles trapped in the perforations of the separation chamber utilizes an overnight soaking of the separation chamber in a hot caustic solution, often a dangerous and time-consuming process. After soaking, the separation chamber is cleaned and rinsed, although many of the particles remain trapped in the perforations. The particles must therefore be dislodged manually using picks or the like, a most labor intensive and time-consuming technique.

SUMMARY OF THE INVENTION

It is therefore an object to the present invention to provide a device and process for completely cleaning the separation chamber of deboning and fruit separation machines by dislodging particles entrapped in the perforations during an operation which is much less time-consuming, more economical and more efficient compared to prior art cleaning techniques.

The cleaning device and process according to the invention involves the use of a pressure vessel containing the separation chamber to be cleaned, super hot steam being introduced into the vessel for gelatinizing the lodged particles. The pressure vessel is then cooled and humidified and the internal pressure is rapidly reduced for forcing the gelled particles through the perforations by the decompressed superatmospheric pressure in the vessel. The entire cleaning cycle takes about 45 to 90 minutes, is safe, economic, and efficient.

Other objects, advantages and other features of the invention will become more apparent from the following detailed description of the invention when taken in conjunction with the accompanying drawings.

BRIEF DESCRIPTION OF THE DRAWINGS

FIG. 2 is a view taken substantially along the line 2—2 of FIG. 1.

DETAILED DESCRIPTION OF THE INVENTION

Figure 1:
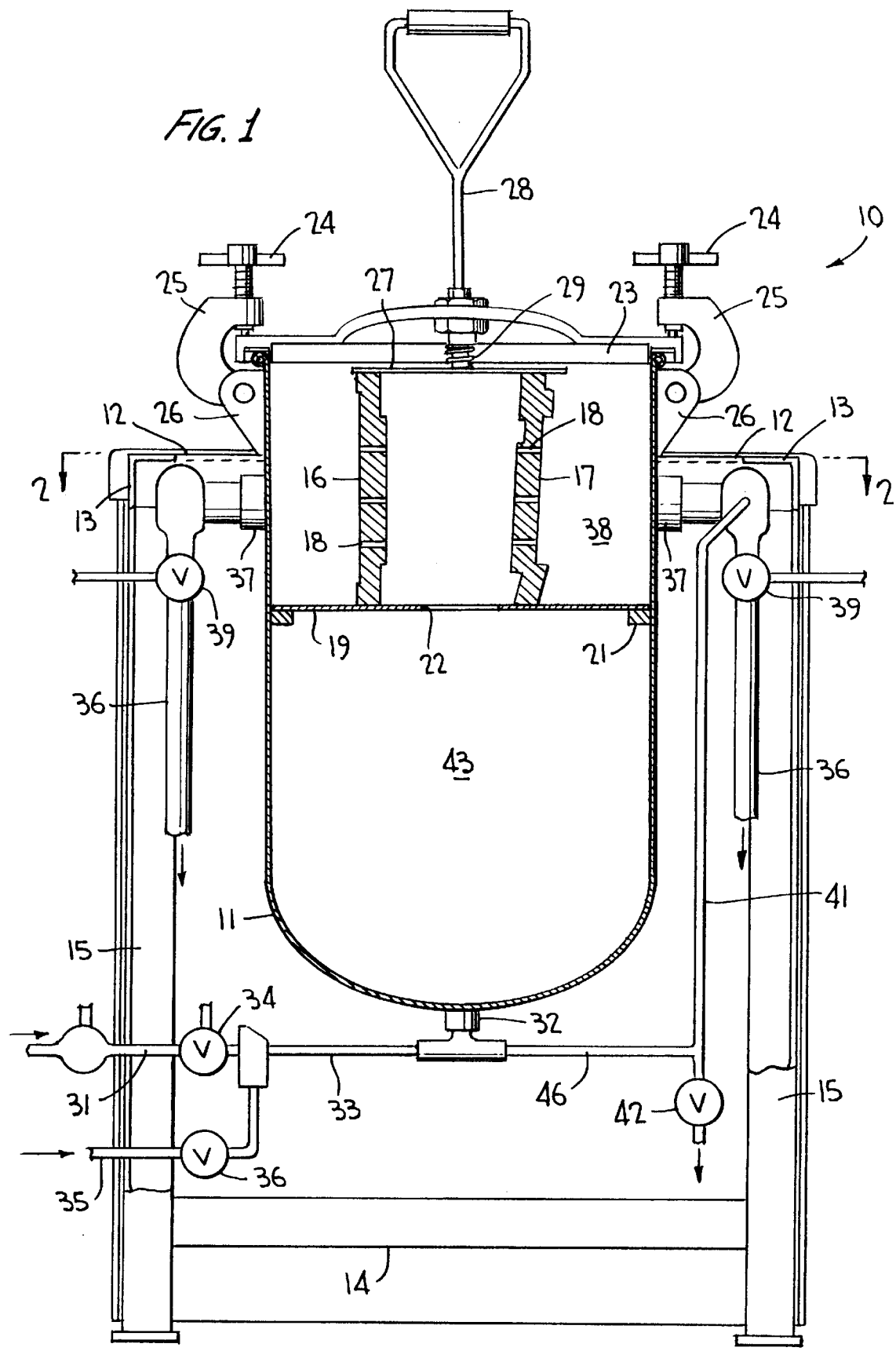
FIG. 1 is a side elevational view, partly in section, of the cleaning device according to the invention.

Turning now to the drawings wherein like reference characters refer to like and corresponding parts throughout the several views, the cleaning device, i.e., chamber cleaner, according to the invention is generally designated 10 in FIG. 1 as comprising a pressure vessel 11 of circular cross-section which, as shown in FIG. 2, has radially extending supports 12 connected to a frame structure of horizontal supports 13, 14 connected to vertical frame legs 15.

A perforated separation chamber 16 or 17 to be cleaned, shown as two different styles each having perforations 18, is supported within the pressure vessel on a shelf 19 supported within the vessel by an annular ring 21. Shelf 19 has a central enlarged opening 22 concentric with chamber 16 or 17, although shelf 19 can otherwise have a plurality of holes or perforations throughout.

The vessel is closed by a removable lid 23 sealed to the upper end of the vessel and maintained tightly held in place by the operation of a plurality of turnscrews 24 supported by legs 25 pivoted to brackets 26.

A bearing plate 27 is connected to a turn handle 28 and bears against the upper edge of chamber 16 or 17 for tightly pressing the separation chamber against its support shelf 19. A coil spring 29 acting between the rod of handle 28 and the bearing plate serves to cushion the bearing plate tightly in place.

According to the invention, the bone particles, sinew and/or cartilage substances lodged in perforations 18 of the separation chamber 16 or 17, are essentially cooked under a given pressure and temperature until such particles and substances are gelatinized. Thereafter, water and steam are fed into a lower chamber of the vessel for cooling and humidifying the vessel, whereafter the vessel is rapidly depressurized for suctioning out the gelled material from the perforations, resulting in a thoroughly cleaned separation chamber during an entire cycle which takes about 45 to 90 minutes.

In carrying out the invention a steam line 31, connected to a hot steam source (not shown), capable of generating steam up to a temperature of about 300° F., is connected to the lower end of the vessel through an inlet 32 via a steam conduit 33. The steam line is valved as at 34, and a water line 35, valved as at 36, extends from a water source (not shown) to conduit 33.

At least a pair, or more, of pressure vent conduits 36 are connected as at 37 to the pressure vessel in open communication with upper chamber 38 thereof in which the separator is mounted. The vent conduits are valve controlled as at 39 by a solenoid so as to be normally opened but closed when reaching a predetermined pressure level, as known for pressure vessels of this type.

Connected to one of the pressure vent conduits is a vent pipe 41, controlled by a solenoid valve 42.

In operation, the perforated separation chamber, such as 16 or 17, is placed in upper chamber 38 of the pressure vessel, and is immobilized against support shelf 19 by bearing plate 27 which is tightened by manipulating turn handle 28. Hot steam in the range of 230° to 270° F. is then fed into lower chamber 43 of the pressure vessel which enters upper chamber 38 via opening 22. A temperature gauge 44 (FIG. 2) mounted on the vessel at the upper chamber, or on lid 23, may be provided for gauging the temperature. And, a pressure gauge 45 is provided on the pressure vessel at the upper chamber, or on lid 23 for sensing the internal pressure.

About every five minutes after inletting the hot steam into the pressure vessel, condensate is bled off via bleed line 46, and the solenoid 42 is set to vent upper chamber 38 for a short interval of time via conduit 41.

The bone particles, sinew and/or cartilage lodged in perforations 18 of the separation chamber, gelatinizes at a temperature of about 230° to 250° F., reaching a pressure of about 35 p.s.i. After about an hour, such as 45 to 90 minutes, with the temperature and pressure building up to these levels within the pressure vessel, during which a time the upper chamber 38 is intermittently vented and bled of condensate, the side pressure vent conduits 36 are opened for rapidly decompressing the pressure vessel whereupon the released superatmospheric pressure within the vessel functions to blow out the gelatinized particles from perforations 18. The separation chamber is thus completely and thoroughly cleaned and sterilized and made ready for reuse.

Following the cleaning operation cooling water through line 35 and steam at a reduced temperature through line 31 are inletted to lower chamber 43 for cooling and humidifying the pressure vessel prior to removal of the cleaned separation chamber. The water is thereafter drained from the vessel via a line 46 into a drainage point (not shown) via open valve 42.

The thoroughly cleaned separation chamber may now be safely removed from the pressure vessel, rinsed and reused.

From the foregoing it can be seen that a simple and efficient yet highly effective cleaning device is provided for a mechanical meat separator which can be used as a fruit separator as well. When perforated separation chamber 16 or 17 is used as a fruit separator, the tiny seeds, such as that of kiwi fruit and raspberries, tend to tightly lodge in perforations 18. The cleaning device of the invention functions to gelatinize the seeds lodged in perforations 18 of the perforation chamber when carrying out the process according to the invention.

The present cleaning device utilizes a steam, rapid decompression and water purge cycle to soften and gelatinize and remove the bone particles, sinew, cartilage or seeds from the perforations 18. Gelatinizing is temperature and time dependent, and the entire cycle takes about 45 to 90 minutes without the use of a hot caustic solution as before requiring overnight soaking, cleaning, rinsing and manual removal of the particles remaining in the perforations of the separation chamber.

The cleaning device according to the invention is adaptable for cleaning any type perforated separation chamber or screen and is not limited to those of the conduit type illustrated at 16 and 17. The cleaning operation is safe, quick, and highly dependable.

Obviously, many other modifications and variations of the present invention are made possible in the light of the above-teachings, without departing from the scope of the invention.

What is claimed is:

1. A process for dislodging hard food particles from perforations of a food separation chamber, comprising the steps of: placing the separation chamber into a closed pressure vessel; while in the vessel subjecting the particles while lodged in the perforations to a predetermined temperature and pressure above atmospheric pressure until the particles are gelatinized; and rapidly depressurizing the vessel for suctioning out the gelatinized particles from the perforations and for cleaning and sterilizing the separation chamber.

2. The process according to claim 1, wherein the particles are subjected to the predetermined pressure and temperature by introducing steam into the vessel up to a temperature of about 300° F.

3. The process according to claim 1, comprising the further step of introducing cooling water and steam into the pressure vessel after the depressurizing step for cooling and humidifying the vessel prior to removal of the clean separation chamber.

4. The process according to claim 1, wherein the step of rapidly depressurizing the vessel is carried out by exposing the interior of the vessel to atmospheric pressure by operation of at least one vent valve interconnected with the pressure vessel.

5. The process according to claim 4, wherein the step of rapidly depressurizing the vessel is carried out subsequent to passage of the predetermined time period during which the pressure and temperature within the pressure vessel is maintained at or above the predetermined threshold.

6. The process according to claim 1, wherein the step of subjecting the particles to a predetermined pressure and temperature is carried out by introducing steam into the pressure vessel so as to raise the pressure and temperature within the pressure vessel to a predetermined threshold.

7. The process according to claim 6, further comprising the step of maintaining the pressure and temperature within the pressure vessel at or above the predetermined threshold for a predetermined time period.

8. A process for dislodging hard food particles from perforations of a food separation chamber, comprising the steps of:

placing the separation chamber into a closed pressure vessel; while in the vessel subjecting the particles while lodged in the perforations to a predetermined pressure and temperature until the particles are gelatinized; and rapidly depressurizing the vessel for suctioning out the gelatinized particles from the perforations and for cleaning and sterilizing the separation chamber;

wherein the vessel is divided into intercommunicating upper and lower chambers, the separation chamber being placed in the upper chamber, the steam being introduced into the lower chamber, and controlling humidity in the vessel by bleeding off condensate at predetermined intervals.

9. A system for dislodging hard food particles from perforations of a food separation chamber, comprising a closed pressure vessel having an interior and including a support member located within the pressure vessel interior, wherein the separation chamber is adapted to be rigidly mounted to the support member, means for subjecting the particles while lodged in the perforations in the vessel to a predetermined pressure and temperature until the particles are gelatinized, and means for rapidly depressurizing the vessel for suctioning out the gelatinized particles from the perforations.

10. The system according to claim 9, wherein said subjecting means comprises means for introducing steam into the vessel up to a temperature of about 300° F.

11. The system according to claim 9, wherein the separation chamber is rigidly mounted to the support member by means of a clamping arrangement associated with a removable cover of the pressure vessel.

12. The system of claim 11, wherein the clamping arrangement comprises a movable clamping member secured to the removable cover of the pressure vessel and spaced from the support member, wherein the separation chamber is clamped between the clamping member and the support member by movement of the clamping member subsequent to engagement of the removable cover with the pressure vessel.

13. The system according to claim 12, further comprising a spring associated with the clamping member for resiliently clamping the separation chamber between the clamping member and the support member.

14. The system according to claim 12, wherein the support member comprises a plate member oriented transversely relative to a longitudinal axis along which the pressure vessel extends.

15. The system according to claim 14, wherein the plate member includes an open inner area, and wherein steam is introduced into the pressure vessel below the plate member and passes through the open inner area into an upper chamber defined by the plate member within which the separation chamber is disposed.

16. The system according to claim 15, wherein the means for rapidly depressurizing the vessel comprises at least one vent valve interconnected with the pressure vessel in the vicinity of the upper chamber.

17. The system according to claim 16, wherein the at least one vent valve is operable to expose the upper chamber to atmospheric pressure.

18. A system for dislodging hard food particles from perforations of a food separation chamber, comprising a closed pressure vessel in which the separation chamber is rigidly mounted, means for subjecting the particles while lodged in the perforations in the vessel to a predetermined pressure and temperature until the particles are gelatinized, and means for rapidly depressurizing the vessel for suctioning out the gelatinized particles from the perforations; wherein the vessel includes an inner, transverse, perforated divider for dividing the vessel into upper and lower chambers, said steam introducing means being connected to said lower chamber, and the separation chamber being mounted in said upper chamber.

19. A system for dislodging hard food particles from perforations of a food separation chamber, comprising a closed pressure vessel in which the separation chamber is rigidly mounted, means for subjecting the particles while lodged in the perforations in the vessel to a predetermined pressure and temperature until the particles are gelatinized, means for rapidly depressurizing the vessel for suctioning out the gelatinized particles from the perforations, wherein the vessel includes an inner, transverse, perforated divider for dividing the vessel into upper and lower chambers, and means for bleeding off condensate from the upper chamber for controlling the humidity in the vessel.

* * * * *